(12) United States Patent
Yang et al.

(10) Patent No.: US 9,900,215 B2
(45) Date of Patent: Feb. 20, 2018

(54) AUTOMATICALLY RECOMMENDING POINT OF PRESENCE CENTERS

(71) Applicant: LinkedIn Corporation, Mountain View, CA (US)

(72) Inventors: Yang Yang, Fremont, CA (US); Liang Zhang, San Francisco, CA (US); Zaid A. Kahn, San Francisco, CA (US); Ritesh Maheshwari, Mountain View, CA (US); Sanjay S. Dubey, Fremont, CA (US); James C. Shieh, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 457 days.

(21) Appl. No.: 14/540,234

(22) Filed: Nov. 13, 2014

(65) Prior Publication Data
US 2016/0142256 A1 May 19, 2016

(51) Int. Cl.
*H04L 12/24* (2006.01)
*H04L 29/08* (2006.01)

(52) U.S. Cl.
CPC .......... *H04L 41/0823* (2013.01); *H04L 41/12* (2013.01); *H04L 41/145* (2013.01); *H04L 41/147* (2013.01); *H04L 67/18* (2013.01)

(58) Field of Classification Search
CPC ..... H04L 41/0823; H04L 67/18; H04L 41/12; H04L 41/147; H04L 41/145
See application file for complete search history.

(56) References Cited

U.S. PATENT DOCUMENTS

| | | | |
|---|---|---|---|
| 2011/0093554 A1* | 4/2011 | Shin ................. | H04L 67/2809 709/207 |
| 2011/0119370 A1* | 5/2011 | Huang ............... | H04L 43/14 709/224 |
| 2015/0112900 A1* | 4/2015 | Ariyoshi ............ | G06N 99/005 706/12 |
| 2016/0226708 A1* | 8/2016 | Maheshwari ....... | H04L 67/10 |

* cited by examiner

*Primary Examiner* — Kim T Nguyen
(74) *Attorney, Agent, or Firm* — Hickman Palermo Becker Bingham LLP; Daniel D. Ledesma

(57) ABSTRACT

Techniques for automatically recommending a new data center, such as a point-of-presence (POP) center are provided. In one technique, multiple candidate locations for a new POP center are considered. An impact of adding a new POP to each candidate location is estimated and a score is generated. Each candidate location is ranked based on the score. In a related technique, an impact score for a candidate location is based on a prediction of whether and how much a new POP center at the candidate location would reduce response times of clients that would connect to the new POP center. The prediction may be based on a model that is generated based on response data generated by clients that are connecting to existing POP centers. The model may take into account multiple factors, such as geographic distance, network distance, type of browser executing on the clients, type of operating system, etc.

26 Claims, 8 Drawing Sheets

AUTOMATICALLY RECOMMENDING POINT OF PRESENCE CENTERS

FIELD OF THE DISCLOSURE

The present disclosure relates to identifying possible locations in which to deploy a point-of-presence center.

BACKGROUND

A point-of-presence (POP) center is a small-scale data center with network equipment and proxy servers. A POP center acts as an end-point for a client device's TCP connection requests. A POP center establishes and holds a connection with a client device while the POP center retrieves at least a portion of the user-requested content from a data center.

A fast connection to a POP center usually translates into a good (or fast) "site speed" of a web site that is supported by the POP center. Typically, the closer a client device is to a POP center, the faster the connection to that POP center. Thus, if a web site owner desires to increase his/her site speed, the web site owner should add POP centers that are close to the web site's users. However, the relationship between geographic distance from a POP center and connection speed is more complicated. Multiple factors other than geographic distance may affect connection speed, making the decision where to add POP centers more difficult.

Furthermore, even though a POP center is less expensive than a full-scale data center, adding a single POP center is still relatively expensive. Thus, simply adding POP centers in areas that one would think would benefit from a POP center is not the best option for resource-constrained web site owners.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for automatically recommending one or more candidate locations in which to deploy a POP center. The identification of a candidate location is based on response data that is determined for multiple client devices. The response data may include how long it takes for a client device to connect to an existing POP center and/or how long it takes for a web page to download from a web site to the client device.

In one technique, an impact score is generated for multiple candidate locations. An impact score indicates how impactful, on response times, a POP center in a candidate location would be for client devices within a region. The candidate location associated with the highest impact score may be selected at a candidate location in which to deploy a POP center.

In one technique, a predictive model is generated based on at least a portion of the response data. The predictive model is used to predict response times for client devices in a particular geographic region if those client devices first connected to a POP center (that does not yet exist) in a candidate location. The predicted response times are used to determine which candidate location would have the most impact if a POP center is deployed in that location.

While the following description refers to automatically recommending a location in which to add a new POP center, embodiments are not so limited. Other types of data centers, such as large-scale data centers, may be the object that is being placed in a candidate location.

Process Overview

Figure 1:
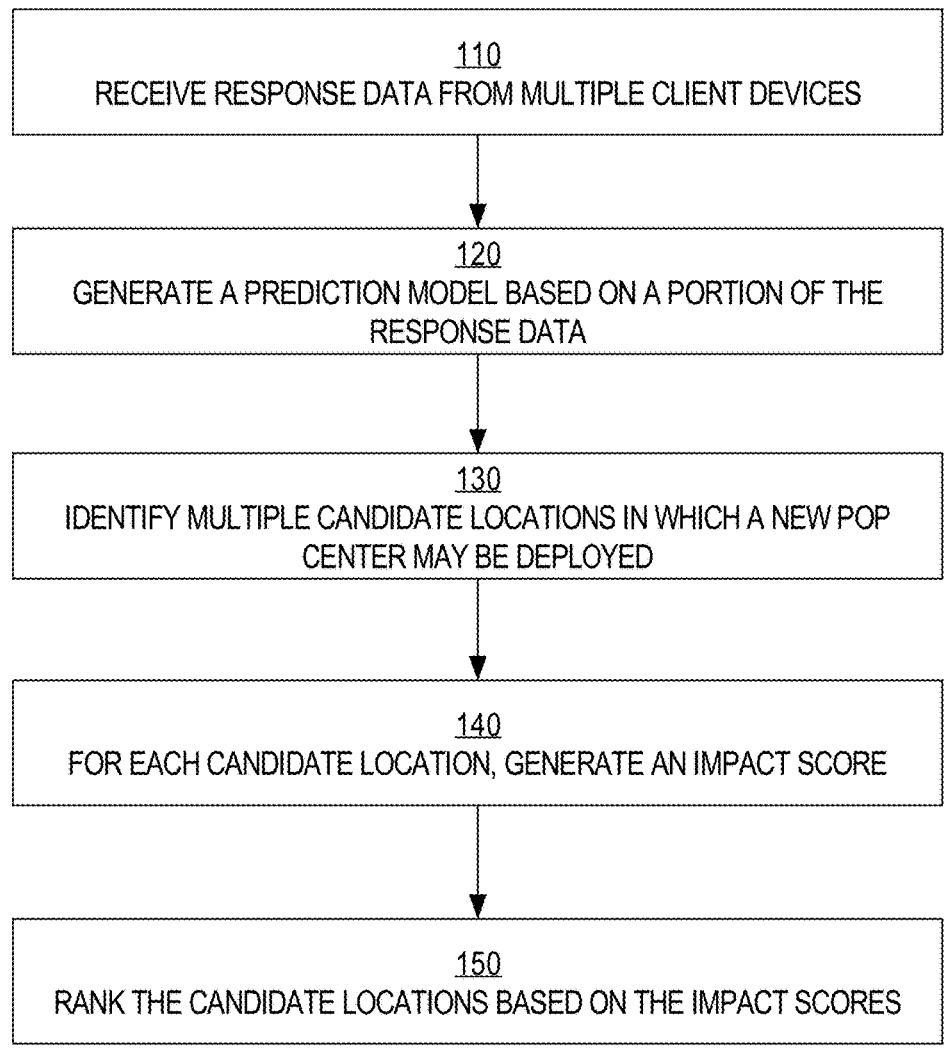
FIG. 1 is flow diagram that depicts a process for automatically recommending a candidate location in which a new POP center will be deployed, in an embodiment.

FIG. 1 is flow diagram that depicts a process 100 for automatically recommending a candidate location in which a new POP center will be deployed, in an embodiment. Process 100 may be performed by one or more computing devices, each including memory, one or more processors, and instructions that are executable by the one or more processors.

At block 110, response data is received from multiple client devices, each of which has requested data from an existing POP center or large scale data center. For example, response data from a single client device may be based on how long it takes (e.g., on average) for the client device to connect to an existing POP center, how long it takes for the client device to receive the first byte of requested data, and/or how long it takes for the entire requested content (e.g., a web page) to be transmitted to the client device.

At block 120, a model is generated based on a portion of the response data. The model is used to predict where the next POP center should be located.

At block 130, multiple candidate locations in which a new POP center may be deployed are identified.

At block 140, for each candidate location, one or more impact scores are generated. An impact score indicates whether and/or how much impact a new POP center in the candidate location would have on client devices that might connect to the new POP center. The impact score takes into account a number of client devices that would benefit from the new POP center and the median (or mean) reduction in response times for those client devices. The model is used to predict what the reduction in response times might be if the new POP center is deployed the candidate location.

At block 150, the multiple candidate locations are ranked based on impact score. One or more of the highest ranked candidate locations may be selected as the next location(s) in which to add a POP center.

Rum Data

In an embodiment, response data is received from client devices that have requested content from a web site that one or more existing data centers and one or more POP centers currently support. An example of response data is real user monitoring data (or "RUM data"). RUM data is generated by code executing on the client devices. The code may execute within a web browser of each client device.

RUM data comprises multiple RUM records. Each RUM record identifies a client device (such as a MAC address or IP address) and includes performance data, such as one or more of connection time, first byte time, or page download time.

Figure 2:
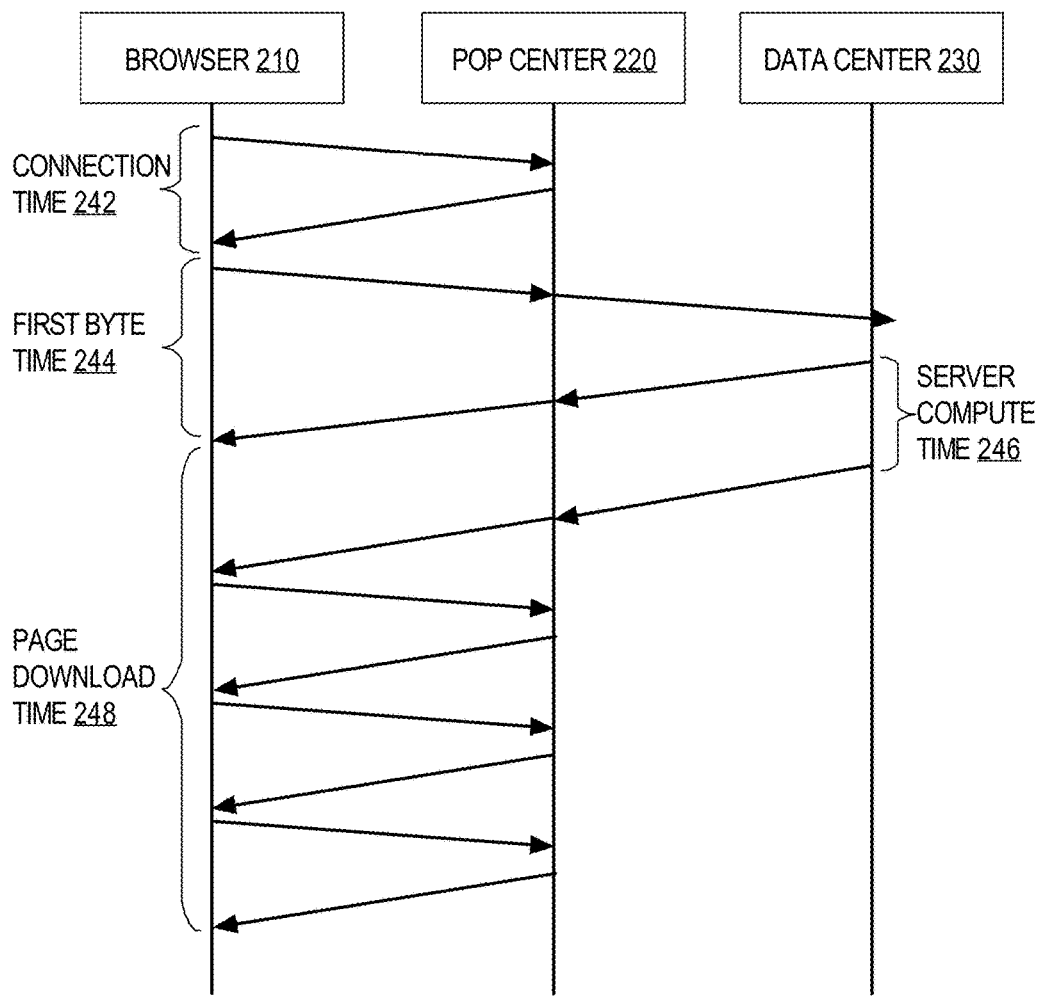
FIG. 2 is a sequence diagram that depicts different parts of a page load time metric, in an embodiment.

FIG. 2 is a sequence diagram that depicts different parts of a page load time metric, in an embodiment. Browser 210 initiates a connection request at a time that begins connection time 242. Connection time 242 refers to a period of time instead of a single point in time. Connection time 242 may begin when a user submits a request for a URL of a web site. The connection request may be a TCP request and is received by POP center 220, which responds with connection information that is used for the TCP connection between browser 210 and POP center 220, such as a pseudo random sequence number. The receipt by browser 210 of the connection information from POP center 220 is the end of connection time 242.

First byte time 244 is also a period of time, which begins when browser 210 sends a request for data, for example, pertaining to a web page. POP center 220 receives the data request and forwards the data request to data center 230, which stores and maintains data that client devices might request. POP center 220 also has an existing "fast" connection with data center 230, which responds to the data request by sending at least a portion of the requested data. For example, data center 230 may send header information to POP center 220, which forwards the header information to browser 210. First byte time 244 ends when browser 210 receives the portion (such as the first byte or the first set of bytes) of the requested data.

Server compute time 246 is a period of time that begins when data center 230 transmits the first byte of requested data to POP center 220 and ends when data center 230 sends the last byte of requested data to POP center 220.

Page download time 248 is a period of time that begins when browser 210 receives the "first byte" of the requested data from POP center 220 and continues until browser 210 receives the last byte of the requested data from POP center 220. As FIG. 2 illustrates, a single transmission of data from data center 230 to POP center 220 may result in multiple round trips between browser 210 and POP center 220, especially if the requested content is relatively significant in size.

Each RUM record may also include information about the client device that generated the RUM record, such as type of browser that is used to connect to an existing POP center or other data center that supports a web site, a type of operating system on which the client device runs, a time of day in which the connection was made, and whether and/or a type of security was used to make the connection.

The code that executes on the client device to collect RUM may be configured to determine when a user provides input that initiates a request for data provided by the web site. For example, the code may keep track of when a user selects an "Enter" key on a keyboard or a "Go" button in a graphical user interface (GUI).

Region Groupings

In an embodiment, client devices are grouped into regions. A region may be a geographic region or a non-geographic region. Examples of geographic regions include a country, a state, a province, or other geographic regions that are defined by political boundaries. Examples of geographic regions that do not correspond to political boundaries include the Mountain West, the Pacific Northwest, the African continent, the Amazon, the Nile Delta, the Central Plains, etc. Such regions may be specified based on user input.

Examples of non-geographic regions include autonomous systems (uniquely identified by autonomous system number (ASN)), network service providers, etc.

Client devices throughout the world may be grouped into (or assigned to) geographic regions, non-geographic regions, or both. Thus, some client devices may be part of a geographic region and other client devices may be part of a non-geographic region.

Impact Score

An impact score is a measure of how much impact a new POP center would have if the new POP center is deployed at a certain location. Although a new POP center may be greatly beneficial, the new POP center may benefit only a relatively small subset of users, especially if the current number of POP centers is relatively high, such as five or six. Thus, in an embodiment, for a single candidate location, an impact score of a new POP center is generated on a per-region basis. Thus, if there are one hundred regions, then one hundred impact scores may be generated for the new POP center.

In a related embodiment, instead of generating an impact score for each possible region, an impact score is generated only for those regions where a certain percentage or number of users would benefit from using the new POP center. For example, if: (1) there are two regions: Brazil and South Africa; (2) existing POP (or large scale data) centers reside in Virginia and Italy; (3) Brazil currently connects to the POP center in Virginia and South Africa currently connects to the POP center in Italy; (4) a majority of users in Brazil would benefit from a POP center in Sao Paulo; and (5) most users in South Africa would be worse off if the users' client devices connected to a POP center in Sao Paulo, then, when generating an impact score for Sao Paulo, the impact score is based on client devices in the Brazil region but not based on client devices in the South Africa region.

In an embodiment, an impact score takes into account a predicted reduced response time and a number of users who would benefit from the predicted reduced response time. For example, if the Brazil region accounts for 4% of all web traffic to a particular web site that is supported by existing POP and large scale data centers, the current median (or average) load time is 2500 milliseconds, and the predicted (e.g., median) page load time is 1900 milliseconds, then an impact score for the Brazil region may be 4%*(2500−1900) =24.

While the above example of reduced response time is that of page load time, one or more other time metrics may be used instead of page load time, such as connection time, first byte time, page download time, or a combination of the two.

Features that Impact Response Time

Multiple features may impact response time. Some features may be related to a proposed new POP center, such as (a) distance between a client device and the proposed new POP center, (b) autonomous system numbers (ASN) of client devices and the new POP center, and (c) distance between the new POP center and an existing data center.

An autonomous system (AS) is a collection of connected Internet Protocol (IP) routing prefixes under the control of one or more network operators that presents a common, clearly defined routing policy to the Internet. A unique ASN is allocated to each AS for use in Border Gateway Protocol (BGP) routing. An ASN is important because an ASN uniquely identifies a network on the Internet.

The distance between a client device and a new POP center may refer to a geographic distance, such as the number of miles or kilometers between the client device (e.g., as determined by IP address) and the proposed new POP center.

Additionally or alternatively, the distance between a client device and a new POP center may be based on network topology and is referred to as "network distance." For example, the number of "hops" between a client device and a new POP center at a candidate location is determined or calculated. A "hop" is one portion of the path between source and destination. Each time a data packet passes from one network device (e.g., gateway or router) to the next, a hop occurs. Using the number of hops as "network distance" may be a more accurate determination of response time than relying on geographic distance, which does not translate into a certain number of hops. For example, a first client device and a candidate location may be two thousand miles away from each other but have only three hops between the first client device and a proposed new POP center at the candidate location. Conversely, a second client device and the candidate location may be two hundred miles away from each other but have twenty network hops between the second client device and the proposed new POP center at the candidate location. As a real-world example, Japan may be "closer" to Los Angeles, Calif. in terms of network distance than to Singapore, even though Japan is geographically much closer to Singapore than Los Angeles.

Other features may not be related to the new POP center, but may still impact the response time, such as the type of operating system that runs on a client device, the type of browser that executes on the client device, one or more characteristics such as the geographical location of an existing data center with which the new POP center would interact, whether a client device request uses Secure Sockets Layer (SSL) or other cryptographic protocol (e.g., "https://www.linkedin.com" or "http://www.linkedin.com"), and "user" characteristics. Examples of user characteristics include size of network to which a client device is connected, region to which the client device belongs, locale of the client device, user's time of registration of the web site, and day and/or hour of user visits to the web site.

Prediction Model

In an embodiment, a prediction model is generated based on at least a portion of RUM data collected from multiple client devices. The RUM data may include not only response data, but also data corresponding to one or more of the above features that impact response time, such as geo-distance, network distance, and/or browser type. The prediction model may be for overall page load time, connection time, or another response time metric.

In an embodiment, a prediction model is generated using regression analysis, which is a statistical process for estimating the relationships among variables. Regression analysis includes many techniques for modeling and analyzing several variables when the focus is on the relationship between a dependent variable and one or more independent variables.

In linear regression, the model specification is that the dependent variable, $y_i$ is a linear combination of the parameters (but need not be linear in the independent variables). For example, in simple linear regression for modeling n data points, there is one independent variable: $x_i$, and two parameters, $\beta_0$ and $\beta_1$, yielding a straight line:

$$y_i = \beta_0 + \beta_1 x_i + \epsilon_i, \ i=1, \ldots, n.$$

In multiple linear regression, there are several independent variables or functions of independent variables. Adding a term in $x_i^2$ to the preceding regression yields a parabola:

$$y_i = \beta_0 + \beta_1 x_i + \beta_2 x_i^2 + \epsilon_i, \ i=1, \ldots, n.$$

Although the expression on the right hand side is quadratic in the independent variable $x_i$, it is still considered linear regression because it is linear in the parameters $\beta_0$, $\beta_1$ and $\beta_2$. In both cases, $\epsilon_i$ is an error term and the subscript i indexes a particular observation.

In the context of embodiments described herein, an example of a prediction model for page load time may be the following:

$$\text{Page Load Time} = a_0 + a_1 \text{Dist} + a_2 \text{ASN} + \ldots + a_p \text{VisitHour} + \text{RandomNoise}$$

where there are p+1 parameters, 'a' is a parameter, 'Dist' refers to geographic distance or network distance, 'ASN' refers to autonomous system number, 'VisitHour' refers to when a client device requests content from a web site, and 'RandomNoise' refers to the independent Gaussian-distributed random variable with mean 0 and variance 1. As the example prediction model for page load time indicates, there may be other features (reflected in the equation) that influence the page load time, such as browser type and operating system.

Feature and Response Transformation

In an embodiment, some attribute values (such as geo-distance and connect time) indicated in RUM records that are used to generate a prediction model are first transformed and the transformed values are used to generate the prediction model. An example of a transformation is reflected in the following example prediction model, which is based on the page load time prediction model described previously:

$$\text{Page Load Time}' = a_0 + a_1 \text{Dist}' + a_2 \text{ASN} + \ldots + a_p \text{VisitHour} + \text{RandomNoise}$$

where Page Load Time' is a non-linear function of the raw Page Load Time, and Dist' is a non-linear function of the raw geo distance between users and pop centers.

As the above example illustrates, values of certain attributes (or "features") and/or the response may be transformed while values of other features are not. The above equation also involves a transformation of the dependent variable, page load time, although transforming the dependent variable is not required. Examples of transformations may be applying a logarithm function (e.g., based 10 or base e) or a square root function to the data set of a feature (such as geo-distance). Such transformations may allow the prediction model to better fit the RUM data (or a portion thereof).

Figure 3:
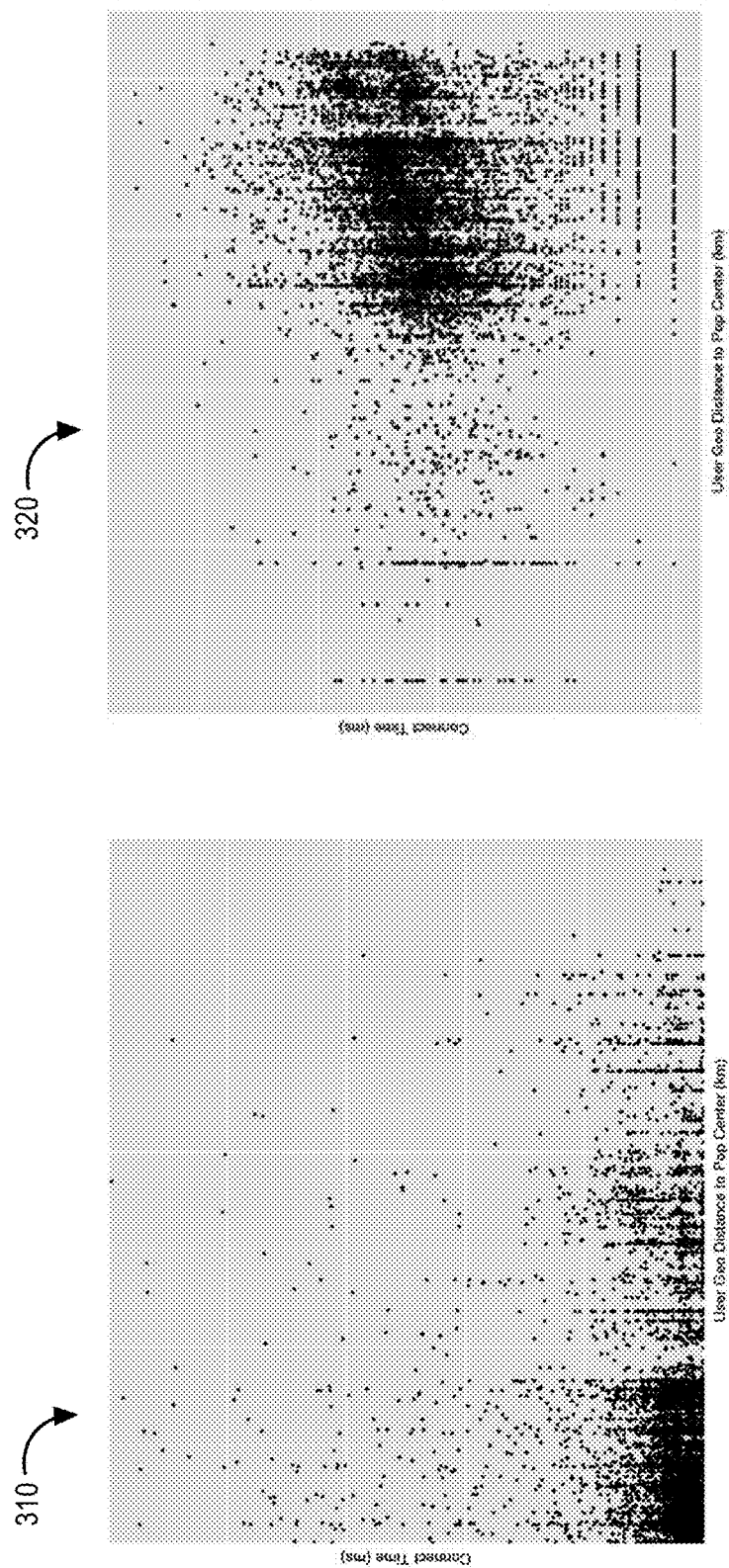
FIG. 3 includes two graphs where one graph depicts a result of transforming a feature and a response in the other graph, in an embodiment.

An example of a feature and response transformation is depicted in FIG. 3, which includes two graphs: graph 310 and graph 320. Graph 310 plots a data point for each RUM record that is used to generate the prediction model. The X-axis is geo-distance (in kilometers) from a client device to a POP center while the Y-axis is connect time (in milliseconds). The data points in graph 310 are transformed based on a log function. While the units of each axis in graph 320 are the same as in graph 310, the data points in graph 310 have been applied to a log function and the results are plotted in graph 320.

Thus, when RUM records (or data derived from RUM records) are applied to the prediction model when predicting response times, certain data of the RUM records (such as geo-distance) may be first transformed and then the transformed data is input to the prediction model.

Non-Linearity of the Prediction Model

Figure 4:
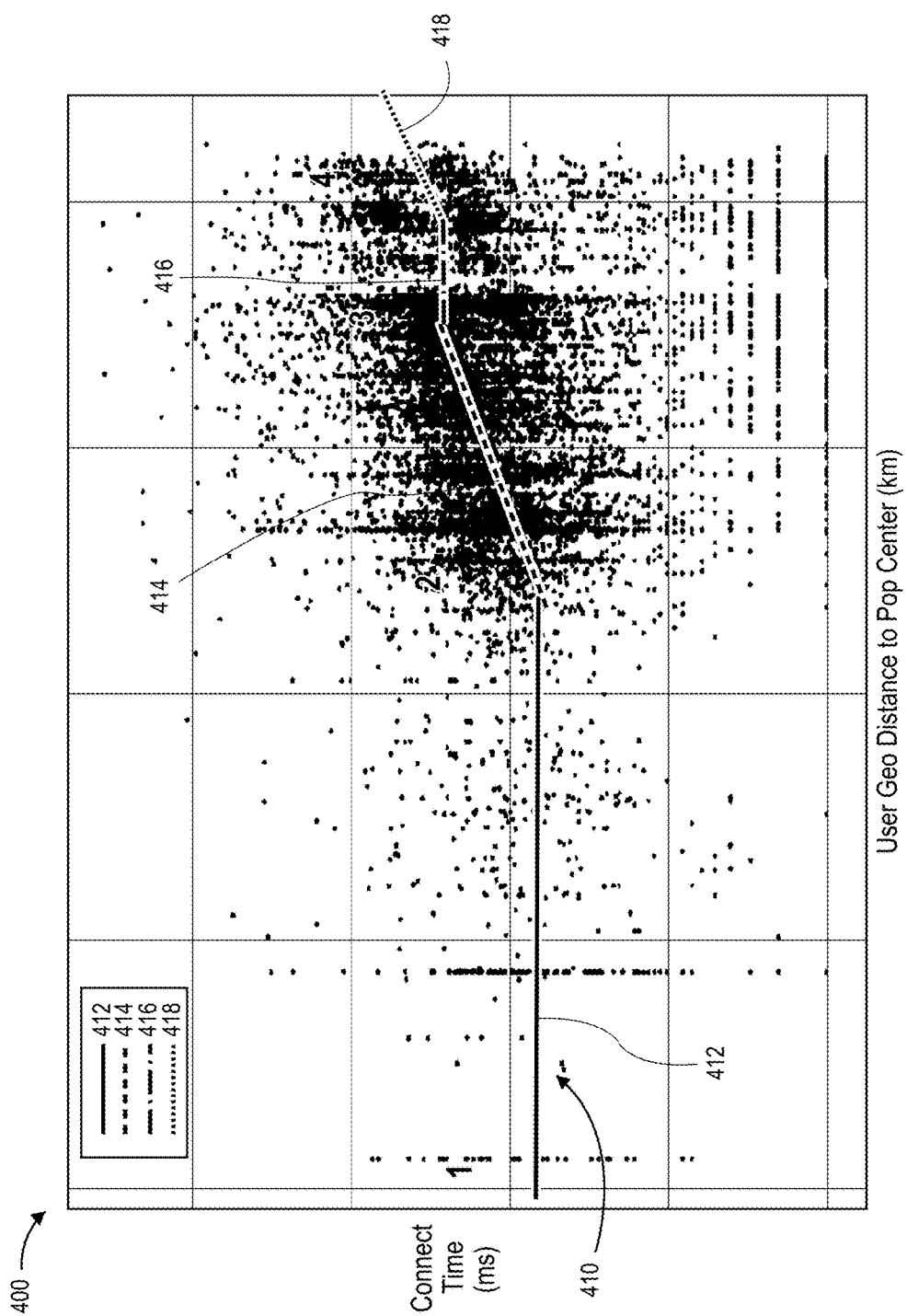
FIG. 4 includes a graph that illustrates the non-linearity of a prediction model, in an embodiment.

In an embodiment, the prediction model reflects a non-linear relationship between feature and response (or result of the inputted values). An example prediction model that corresponds to the prediction model described previously is as follows:

Page Load Time'=$a_0+a_1f_1(\text{Dist}')+a_2f_2(\text{ASN})+\ldots+a_pf_p(\text{VisitHour})+\text{RandomNoise}$ where "$f_i(\ )$" refers to a specific function that is applied to feature i. For example, the function can be a linear spline that shows good predictive performance in this application. Adding such a function to one or more features allows a prediction model to more accurately reflect the non-linear relationship between feature and response, if such a relationship exists. FIG. 4 depicts a graph 400 that illustrates the non-linearity of geographic distance (feature) and connect time (response). Graph 400 includes a line 410 that is divided into at least four portions: portions 412-418. Function $f_i(\text{Dist}')$ is configured to plot each of portions 412-418 in graph 400.

Splitting the Prediction Model

In an embodiment, a prediction model is split into multiple equations. For example, as described previously, the page load time metric may be composed of multiple individual metrics: connection time, first byte time, and page download time. Thus, a prediction model may be generated for each of three individual times or for a combination of the two. For example, the following are two prediction models:

ConnectTime'=$a_0+a_1f_1(\text{Dist}')+a_2f_2(\text{ASN})+\ldots+a_pf_p(\text{VisitHour})+\text{RandomNoise}$ FirstByteTime'+PageDownloadTime'=$b_0+b_1g_1(\text{Dist}')+b_2g_2(\text{ASN})+\ldots+b_pg_p(\text{VisitHour})+\text{RandomNoise}$ In this way, a more accurate overall page load time may be predicted by first predicting, for example, connect time and first byte time (which predicted times may be more accurate individually) and then summing the result.

Quantile Regression

In an embodiment, instead of using linear regression to generate a prediction model, quantile regression is used to generate the prediction model. Thus, the median (50% quantile) response time (e.g., whether page load time or connect time) may be used instead of the average response time. One advantage that the quantile regression approach has over linear regression is that quantile regression is insensitive to outliers and data skewness. Additionally or alternatively, any quantile (e.g., 90%) may be predicted, if needed.

The following equation is an example of how linear regression may be used to generate a prediction model:

$$\hat{\beta}_{OLS} = \operatorname*{argmin}_{\beta} \sum_i (y_i - x'_i\beta)^2$$

where OLS refers to "Ordinary Least Squares", i refers to a particular observation or data point, which may be reflected in a single RUM record, $y_i$ refers to the y-axis (such as connect time or page load time) for data point i, $x_i'$ refers to the set of features, and $\beta$ refers to the unknown coefficients to be learned.

The following equation is an example of how quantile regression may be used to generate a prediction model:

$$\hat{\beta}_{QR}(\tau) = \operatorname*{argmin}_{\beta} \sum_i \rho_\tau(y_i - x'_i\beta)$$

where $p_\tau(y)=y(\tau-I(y<0))|$ and $\tau \in (0,1)$ where QR refers to "Quantile Regression", $\tau$ is 0.5 if median regression is intended, I is an indicator function (1 if the condition is true, 0 otherwise), and $\beta$ refers to the unknown coefficients to be learned.

Calculating and Impact Score Using a Prediction Model

Once a prediction model is generated, the prediction model is used to predict how long it would take for different client devices to connect to a new POP center in a candidate location. The prediction may be based on a region-by-region basis. For example, the prediction model may be used to predict (1) an average or median response time for client devices in region A and (2) an average or median response time for client devices in region B. Then, a predicted response time for a particular region is compared to the actual (e.g., average or median) response time for the particular region. If the predicted response time is less than the actual response time, then the difference is used to determine an impact score for the particular region.

Figure 5A:
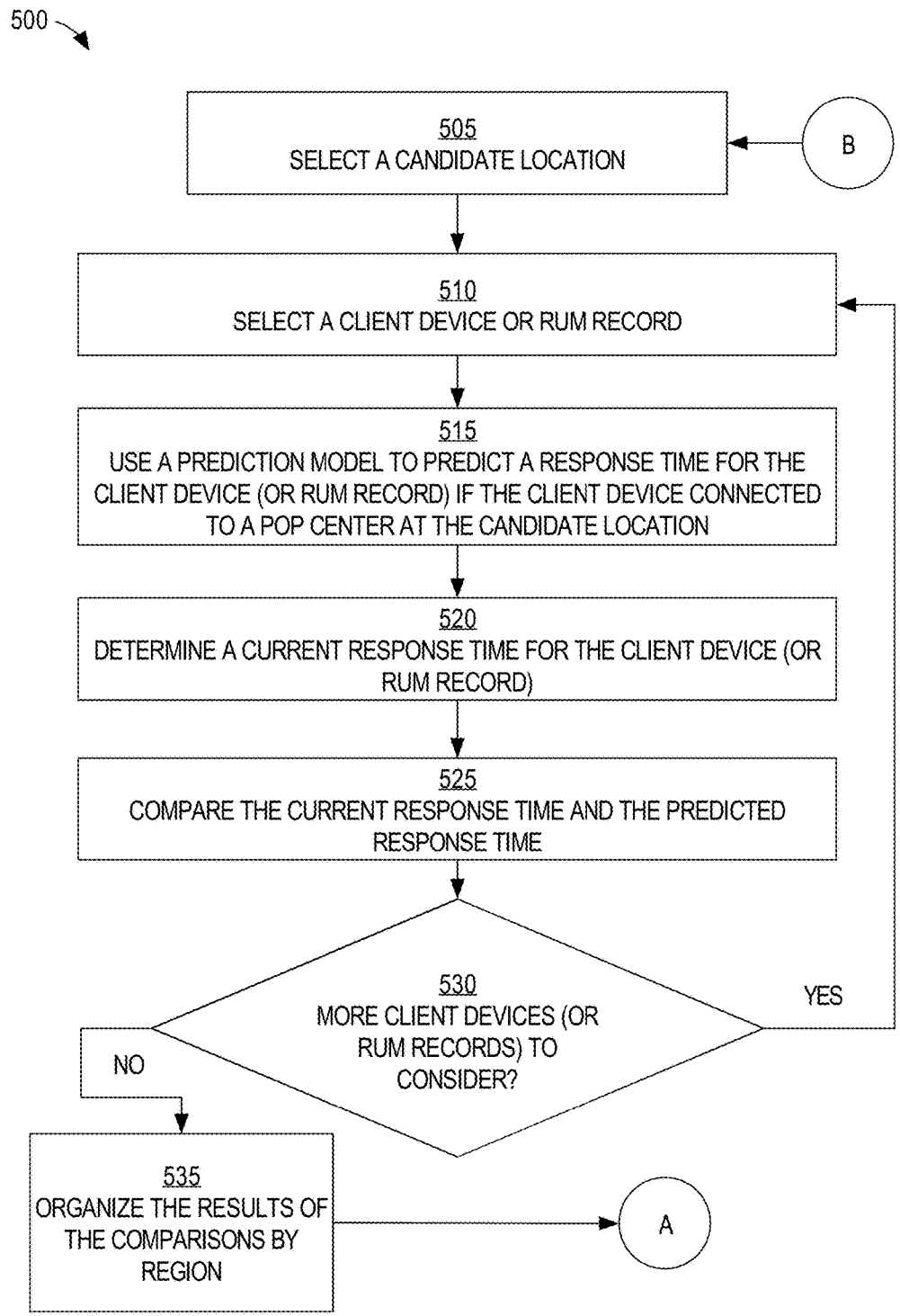
FIGS. 5A-5B include a flow diagram that depicts a process for calculating an impact score using a prediction model, in an embodiment.
Figure 5B:
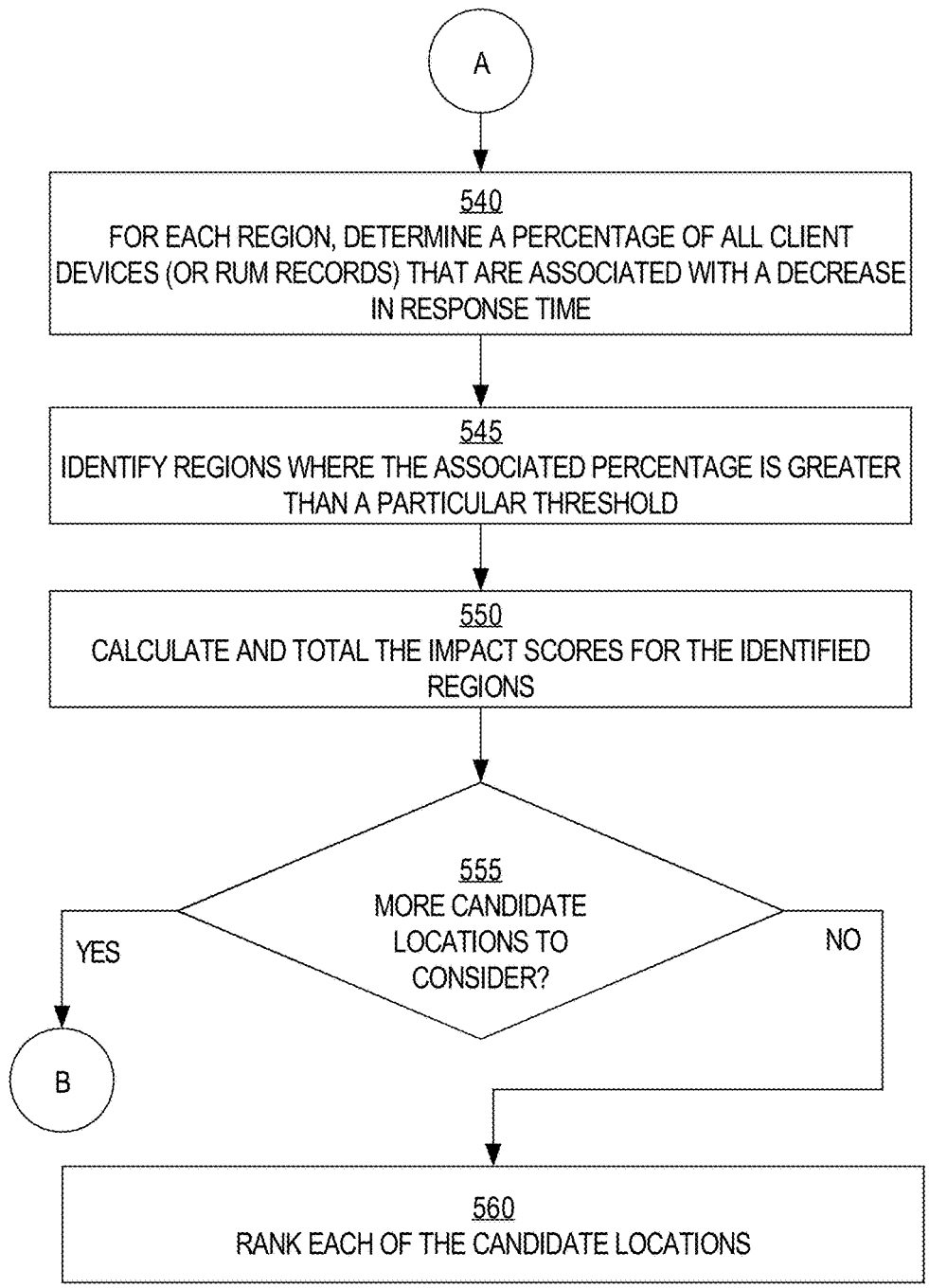

FIGS. 5A-5B include a flow diagram that depicts a process 500 for calculating an impact score using a prediction model, in an embodiment.

At block 505, a candidate location is selected. Process 500 may involve considering multiple candidate locations. A candidate location may be, for example, specific geographic coordinates (e.g., latitude and longitude) or a city name. In an embodiment, the identity of multiple candidate locations is maintained by (and retrieved from) a third-party, such as peeringDB, which is an open collaborative database.

At block 510, a client device is selected. A client device may be selected by analyzing RUM data for one or more RUM records that reflect features of the client device and response time(s) with respect to the client device and an existing POP center. Thus, the RUM data may be organized such that RUM records are grouped based on client device.

Alternatively, block 510 may involve selecting an individual RUM record, which corresponds to a single session between a client device and an existing POP center. An individual RUM record may indicate an IP address of the client device, a MAC address of the client device, an ASN, a time of day (e.g., when the connection occurred), a single connect time, a single first byte time, and/or a single page download time.

At block 515, the prediction model is used to predict what a response time might be for the client device (e.g., of the RUM record selected in block 510) if the client device instead connected to a POP center at the candidate location. This response time is referred to herein as a "predicted response time."

The portion of the RUM data that is used to generate the predicted response time may be different than the portion of the RUM data that is used to generate the prediction model. For example, ⅓ of the RUM data may be used to generate the prediction model while ⅔ of the RUM data may be used to generate predicted response times for different client devices or RUM records.

At block 520, a current response time is determined for the client device (or RUM record if block 510 involved selecting a RUM record). If there are multiple RUM records for the client device, then the current response time may be an average response time, the median response time, the slowest response time, the fastest response time, or, for example, the 90% percentile of the slowest response time.

At block 525, the current response time and the predicted response time are compared to each other (e.g., subtracted) to determine whether the predicted response time is less than the current response time. For example, if (1) a client device currently connects to a POP center in Virginia of the United States and is associated with a current response time and (2) the prediction model is used to determine a predicted response time if the client device instead connected to a POP center (that does not yet exist) in Sao Paulo, Brazil, then the two times are compared to determine which time is greater.

Alternatively, if there are multiple RUM records for the client device, instead of finding a mean or median current response time, each response time indicated by each RUM record for the client device is compared to the predicted response time. In this approach, block 510 involves selecting an individual RUM record. In this way, client devices that access the web site most often will have a greater influence on the impact score than client devices that access the web site only once or relatively rarely.

At block 530, it is determined whether to consider any other client devices (or RUM records). If so, process 500 returns to block 510. Otherwise, process 500 proceeds to block 535. The determination in block 530 may be whether any client devices (or RUM records) have not yet been considered. Thus, process 500 may be performed for all known client devices for which one or more RUM records are available, regardless of where the client devices are located in the world. Alternatively, only client devices that are located within certain regions may be considered. For example, a user may specify that client devices in only regions A and B should be considered when estimating the impact of a new POP center in a particular candidate location. As another example, process 500 may be configured to only automatically consider (1) client devices that are within a particular region in which the candidate location is located and (2) client device that are in regions that border that particular region.

As noted previously, the population of RUM records that are used during blocks 510 and 515 may be limited to only those RUM records that have not been used to generate the prediction model.

At block 535, the result of the comparison between prediction response times and corresponding current response times (in block 525) are organized by region.

At block 540, for each region, a percentage of all client devices or RUM records that are associated with a decrease in response time is determined. For example, if there are 1,287 client devices (or RUM records) in region A and it was predicted that 543 client devices (or connection attempts represented by the RUM records) would experience a reduction in response time if a new POP center is deployed at the candidate location, then the percentage is approximately 42.2%.

At block 545, for each region, it is determined whether the percentage determined in block 540 greater than a threshold percentage, such as 50%. If so, then, at block 550, the corresponding region is considered a candidate region with respect to the candidate location. For regions where the determined percentage is less than the threshold percentage, those regions are not further considered with respect to the candidate location selected in block 505.

At block 550, for each candidate region determined in block 545, an impact score is calculated for that candidate region. The impact score may be calculated in numerous ways. For example, the mean or median predicted reduction in response times is multiplied by the number of client devices (or RUM records) associated with the candidate region and divided by the number of total client devices (or RUM records) that have accessed the website. An equation that represents this calculation is as follows:

$$\text{Impact Score} = \Sigma(\text{Median}(\{\Delta_i(j); j \in J\}) \times N(J)/N)$$

where "Impact Score" refers to an estimated impact of adding a POP center to the currently-selected candidate location, j is a RUM record, J is a region, i is a candidate location, N is a total number of client devices or total number of RUM records (e.g., throughout the world, pertaining to the website), N(J) is the total number of client devices or RUM records associated with region J, and the summation ($\Sigma$) is over each candidate region J. The result of the calculation within the first parentheses is an impact score of a particular candidate region.

At block 555, it is determined whether there are any more candidate locations to consider. Block 555 is performed if multiple candidate locations are considered when determining where to deploy a new POP center. If there are more candidate locations to consider, then process 500 returns to block 505. Otherwise, process 500 proceeds to block 560.

Alternatively, block 555 is not performed. Instead, blocks 505-550 are performed multiple times in parallel. For example, one computing device performs blocks 505-550 for one candidate location and another computing device performs blocks 505-550 for another candidate location.

At block 560, each of the candidate locations (for which an impact score was generated) is ranked relative to each other based on the calculated impact scores. (In the case of a single candidate location, a single impact score is presented to a user.) A list of candidate location identifiers (such as City and Country name) may be displayed to a user to allow the user to view which candidate location is predicted to have the largest impact. The list may be ordered based on impact score. Additionally or alternatively, the impact score for each candidate location may be displayed adjacent to the corresponding candidate location identifier.

Figure 6:
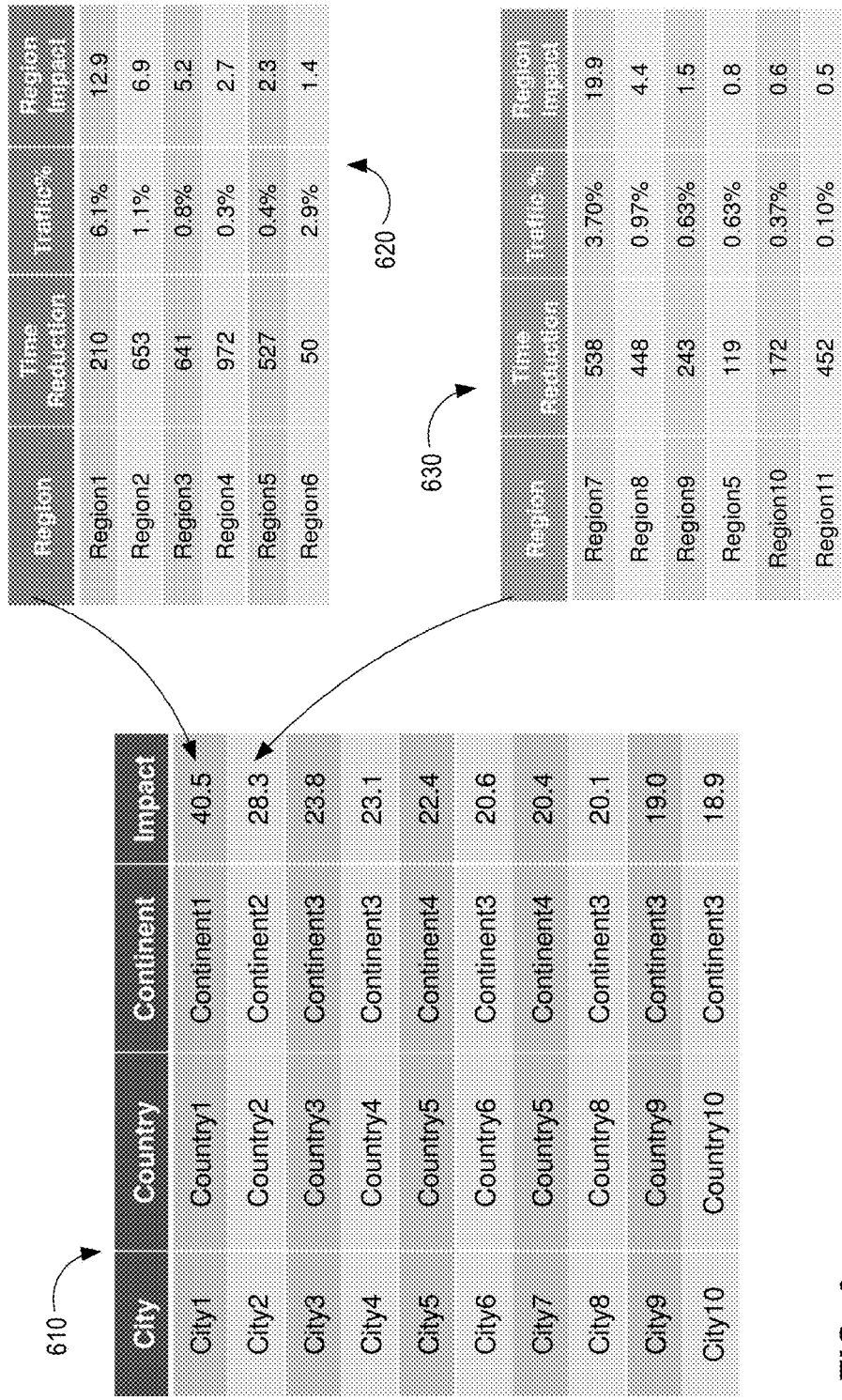
FIG. 6 depicts three tables, each showing results of calculating impact scores for various regions throughout the world.

FIG. 6 depicts three tables: 610, 620, and 630, each showing results of calculating impact scores for various regions throughout the world. Table 610 includes a row for each of ten candidate locations. The last column in table 610 stores an impact score for the corresponding candidate locations. The candidate locations listed in table 610 are ordered based on impact score.

Table 620 includes a row for each of six regions that are predicted to be positively impacted by a POP center in candidate location Dubai, Arab Emirates. For each region listed in table 620, table 620 indicates a predicted reduction in response time (e.g., connect time or page load time), a percentage of user traffic to a particular website (or group of websites) that originate in the corresponding region, and an impact score for the corresponding region. The impact scores in table 620 may be added together to calculate an overall impact score that is indicated in Table 610. Table 630 is similar to table 620 in type of content, except that the listed regions are regions that are predicted to be positively impacted by a POP center in Sao Paulo, Brazil.

Multiple Pop Centers

In an embodiment, the impact of adding multiple new POP centers at one time is automatically determined. Thus, instead of identifying which candidate location of multiple candidate locations would have the greatest impact if a new POP center is deployed at one of the candidate locations, a combination of two or more candidate locations is considered. For example, an impact score is generated for each of multiple regions if one POP center is deployed to candidate location A and another is deployed to candidate location B. If a particular region experiences a greater reduction in response times relative to candidate location A rather than candidate B, then an impact score is generated that reflects the scenario where client devices in the particular region connect to a new POP center in candidate location A.

The following equation may be used for recommending multiple POP centers:

$$\operatorname*{argmax}_{p_1,\ldots,p_X} \sum_J \max_{p \in \{p_1,\ldots,p_X\}} \Delta(p, J)$$

where p is a candidate location, J is a region, X is the number of candidate locations considered at one time, and Δ(p, J) is an impact score for region J if a POP center is added to candidate location p.

If X is relatively large (such as ten), then determining which combination of candidate locations to add a POP center will require a significant amount of time and computing resources. To address this computation problem, in an embodiment, Map-Reduce is used to determine a (potentially optimal) combination of candidate locations in which to add a POP center. Map-Reduce is a programming model and an associated implementation for processing large data sets with a parallel, distributed algorithm on a cluster. A Map-Reduce system orchestrates the processing by marshalling distributed servers, running various tasks in parallel, managing communications and data transfers between the various parts of the system, and providing for redundancy and fault tolerance.

Benefits

By intelligently identifying a candidate location for a new POP center according to techniques described herein, an individual or organization that maintains one or more websites that are supported by the new POP center can achieve a "desired bang for the buck." As a result of deploying a new POP center at the candidate location, greater web site speed is realized for a large number of users. Greater site speed, in turn, may translate into increased number of page views, greater user retention, increased number of clicks, and increased revenue.

Predicting Other Metrics

While techniques described herein have focused on predicting response times, other metrics may be predicted, such as (e.g., mean or median) page views per session, a median number of clicks, and average revenue generated. Thus, candidate locations may be ranked based on one or more of these other metrics instead of response time.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
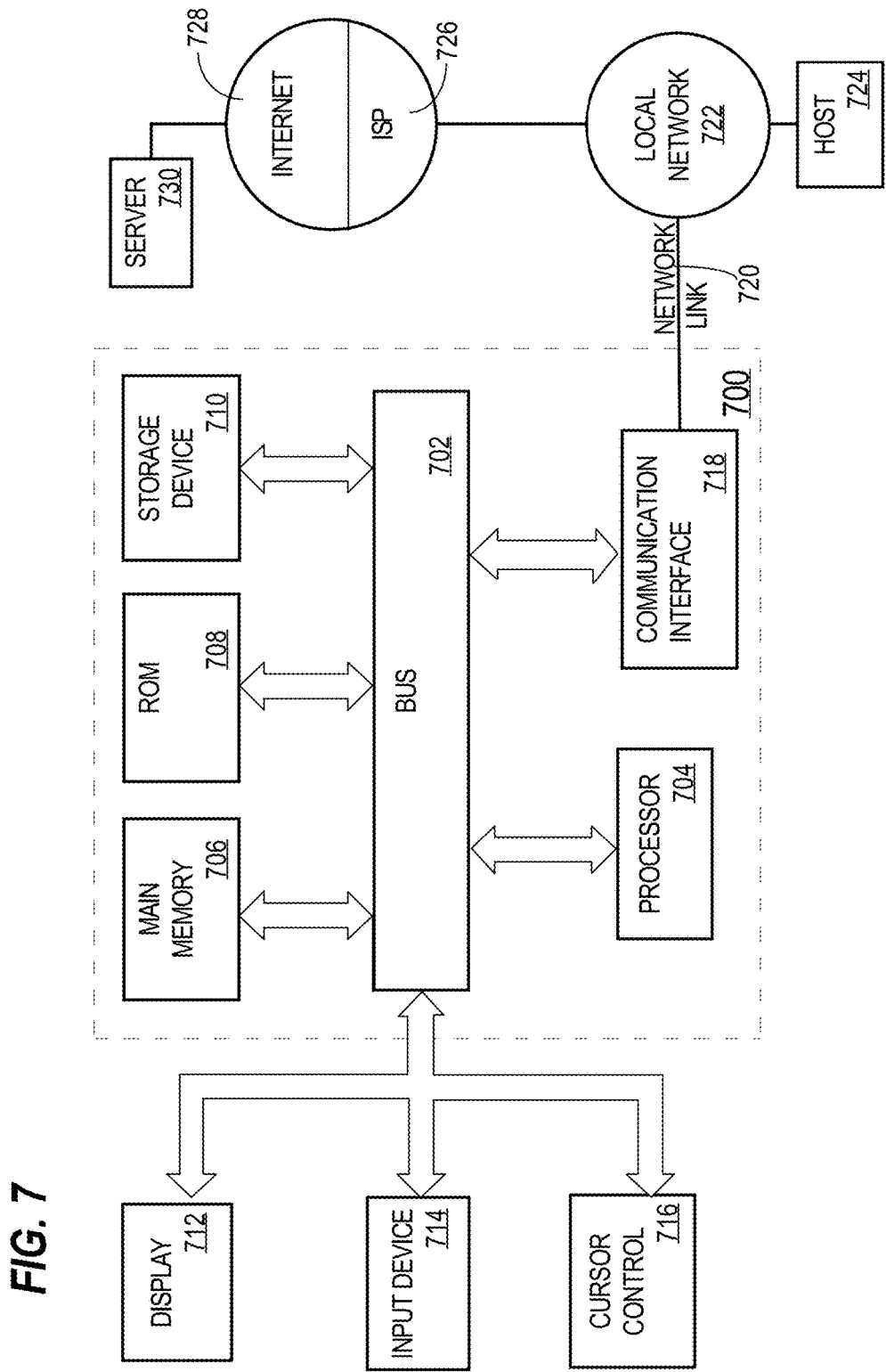
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
receiving, from a plurality of client devices, response data that indicates one or more measures of responsiveness of a plurality of existing data centers;
based on the response data, generating a prediction model that is used to predict, for each possible location of multiple possible locations, an estimated time reduction if a data center is deployed at said each possible location;
generating, based on the prediction model and a plurality of candidate locations, a plurality of estimated time reductions;

wherein generating the plurality of estimated time reductions comprises, for each candidate location of the plurality of candidate locations:
for each client device of the plurality of client devices:
determining, based on the prediction model, an estimated response time associated with said each client device if a data center is deployed at said each candidate location,
determining an estimated time reduction for said each client device based on a difference between the estimated response time and an actual response time associated with said each client device with respect to an existing data center;
selecting, based on the plurality of estimated time reductions, a particular location of the plurality of candidate locations to recommend as a location in which to add a new data center;
causing the particular location to be presented on a computing device for display;
wherein the method is performed by one or more computing devices.

2. The method of claim 1, wherein the response data indicates one or more of a connection time, a first byte time, or a page download time.

3. The method of claim 1, wherein:
selecting comprises, for each candidate location of the plurality of candidate locations, generating an impact score of adding a data center at said each candidate location;
selecting comprises selecting based on the impact score of said each candidate location.

4. The method of claim 3, wherein generating the impact score comprises:
generating the impact score based on a percentage of users that would use a data center at said each candidate location and an estimated time reduction if the data center is deployed at said each candidate location.

5. The method of claim 3, wherein generating the impact score comprises generating an impact score for candidate locations where a percentage of client devices or instances of user access, in a geographical region, that would benefit from a data center deployed in said candidate location exceeds a particular threshold.

6. The method of claim 1, wherein each estimated time reduction in the plurality of estimated time reductions pertains to one or more of a connection time, a first byte time, or a page download time.

7. The method of claim 1, wherein generating the prediction model comprises generating the prediction model based on multiple features, including one or more of the following features:
geographical distance between the plurality of client devices and a first subset of the plurality of existing data centers;
autonomous system numbers (ASN) of the plurality of client devices and a second subset of the plurality of existing data centers; or
network distance between the plurality of client devices and a third subset of the plurality of existing data centers.

8. The method of claim 1, wherein generating the prediction model comprises generating the prediction model based on one or more of the following features:
type of operating system of the plurality of client devices;
type of browser installed on the plurality of client devices;
data center that services the plurality of client devices;
country or geographic region in which each of the plurality of client devices resides;
time or date of one or more visits by the plurality of client devices;
time or date of registration of the plurality of client devices with a particular website.

9. The method of claim 1, further comprising:
prior to generating the prediction model, applying a transformation to a plurality of values, indicated in the response data, to generate a plurality of transformed values, wherein the plurality of values correspond to one or more features;
wherein generating the prediction model comprises generating the prediction model based on the plurality of transformed values.

10. The method of claim 9, further comprising:
after the generating the prediction model, applying the transformation to a second plurality of values to generate a second plurality of transformed values;
for each transformed value of the second plurality, inputting said each transformed value into the prediction model to predict a particular estimated time reduction for a client device that corresponds to said each transformed value.

11. The method of claim 1, wherein the plurality of existing data centers is a plurality of point-of-presence (POP) centers.

12. The method of claim 1, wherein the prediction model is generated using regression analysis.

13. The method of claim 1, wherein:
a first subset of the plurality of estimated reduction times correspond to a first candidate location in the plurality of candidate locations;
a second subset of the plurality of estimated reduction times correspond to a second candidate location in the plurality of candidate locations;
the method further comprising:
generating a first score based on the first subset;
generating a second score based on the second subset;
selecting the particular location is based on the first score and the second score.

14. A method comprising:
receiving, from a plurality of client devices, response data that indicates one or more measures of responsiveness of a plurality of existing data centers;
storing region data that indicates a plurality of regions;
storing region association data that associates, for each client device of the plurality of client devices, said each client device with one of the plurality of regions;
for each candidate location of a plurality of candidate locations:
for each region in a subset of the plurality of regions:
identifying, based on the region association data, a first number of client devices that are associated with said each region;
for each client device in the first number of client devices, identifying a predicted response time if said each candidate location is selected as a next location in which to deploy a data center;
identifying a second number of client devices that are associated with said each region and that are associated with a predicted response time that is less than an actual response time indicated in the response data;
selecting, based on the second number of client devices identified for each region, a particular location of the plurality of candidate locations to recommend as a location in which to add a new data center;
causing the particular location to be presented on a display of a computing device.

15. A system comprising:
one or more processors;
one or more storage media storing instructions which, when executed by the one or more computing devices, cause:
  receiving, from a plurality of client devices, response data that indicates one or more measures of responsiveness of a plurality of existing data centers;
  based on the response data, generating a prediction model that is used to predict, for each possible location of multiple possible locations, an estimated time reduction if a data center is deployed at said each possible location;
  generating, based on the prediction model and a plurality of candidate locations, a plurality of estimated time reductions;
  wherein generating the plurality of estimated time reductions comprises, for each candidate location of the plurality of candidate locations:
    for each client device of the plurality of client devices:
      determining, based on the prediction model, an estimated response time associated with said each client device if a data center is deployed at said each candidate location,
      determining an estimated time reduction for said each client device based on a difference between the estimated response time and an actual response time associated with said each client device with respect to an existing data center;
    selecting, based on the plurality of estimated time reductions, a particular location of the plurality of candidate locations to recommend as a location in which to add a new data center;
    causing the particular location to be presented on a computing device for display.

16. The system of claim 15, wherein the response data indicates one or more of a connection time, a first byte time, or a page download time.

17. The system of claim 15, wherein:
selecting comprises, for each candidate location of the plurality of candidate locations, generating an impact score of adding a data center at said each candidate location;
selecting comprises selecting based on the impact score of said each candidate location.

18. The system of claim 17, wherein generating the impact score comprises:
generating the impact score based on a percentage of users that would use a data center at said each candidate location and an estimated time reduction if the data center is deployed at said each candidate location.

19. The system of claim 17, wherein generating the impact score comprises generating an impact score for candidate locations where a percentage of client devices or instances of user access, in a geographical region, that would benefit from a data center deployed in said candidate location exceeds a particular threshold.

20. The system of claim 15, wherein each estimated time reduction in the plurality of estimated time reductions pertains to one or more of a connection time, a first byte time, or a page download time.

21. The system of claim 15, wherein generating the prediction model comprises generating the prediction model based on one or more of the following features:
  geographical distance between the plurality of client devices and a first subset of the plurality of existing data centers;
  autonomous system numbers (ASN) of the plurality of client devices and a second subset of the plurality of existing data centers, or
  network distance between the plurality of client devices and a third subset of the plurality of existing data centers.

22. The system of claim 15, wherein generating the prediction model comprises generating the prediction model based on one or more of the following features:
  type of operating system of the plurality of client devices;
  type of browser installed on the plurality of client devices;
  data center that services the plurality of client devices;
  country or geographic region in which each of the plurality of client devices resides;
  time or date of one or more visits by the plurality of client devices; or
  time or date of registration of the plurality of client devices with a particular website.

23. The system of claim 15, wherein the instructions, when executed by the one or more processors, further cause:
  prior to generating the prediction model, applying a transformation to a plurality of values, indicated in the response data, to generate a plurality of transformed values, wherein the plurality of values correspond to one or more features;
  wherein generating the prediction model comprises generating the prediction model based on the plurality of transformed values.

24. The system of claim 23, wherein the instructions, when executed by the one or more processors, further cause:
  after the generating the prediction model, applying the transformation to a second plurality of values to generate a second plurality of transformed values;
  for each transformed value of the second plurality, inputting said each transformed value into the prediction model to predict a particular estimated time reduction for a client device that corresponds to said each transformed value.

25. The system of claim 15, wherein the instructions, when executed by the one or more processors, further cause:
  storing region data that indicates a plurality of regions;
  storing region association data that associates, for each client device of the plurality of client devices, said each client device with one of the plurality of regions;
  for each candidate location of the plurality of candidate locations:
    for each region of the plurality of regions:
      identifying, based on the region association data, a first number of client devices that are associated with said each region;
      for each client device in the first number of client devices, identifying a predicted response time if said each candidate location is selected as a next location in which to deploy a data center;
      identifying a second number of client devices that are associated with said each region and that are associated with a predicted response time that is less than an actual response time.

26. The system of claim 15, wherein the plurality of existing data centers is a plurality of point-of-presence (POP) centers.

\* \* \* \* \*

UNITED STATES PATENT AND TRADEMARK OFFICE
CERTIFICATE OF CORRECTION

PATENT NO. : 9,900,215 B2  
APPLICATION NO. : 14/540234  
DATED : February 20, 2018  
INVENTOR(S) : Yang Yang et al.

Page 1 of 1

It is certified that error appears in the above-identified patent and that said Letters Patent is hereby corrected as shown below:

On the Title Page

Item (71) Applicant:
Please remove "LinkedIn Corporation, Mountain View, CA" and replace with --Microsoft Technology Licensing, LLC, Redmond, WA--.

Signed and Sealed this
Tenth Day of April, 2018

Andrei Iancu
*Director of the United States Patent and Trademark Office*